United States Patent
Rosenberger

(10) Patent No.: US 11,536,172 B2
(45) Date of Patent: Dec. 27, 2022

(54) OIL MEASUREMENT APPARATUS

(71) Applicant: Bayerische Motoren Werke Aktiengesellschaft, Munich (DE)

(72) Inventor: Maximilian Rosenberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/252,783

(22) PCT Filed: Jul. 3, 2019

(86) PCT No.: PCT/EP2019/067794
§ 371 (c)(1),
(2) Date: Dec. 16, 2020

(87) PCT Pub. No.: WO2020/016006
PCT Pub. Date: Jan. 23, 2020

(65) Prior Publication Data
US 2021/0254520 A1    Aug. 19, 2021

(30) Foreign Application Priority Data
Jul. 19, 2018    (DE) ..................... 10 2018 212 021.8

(51) Int. Cl.
*F01M 11/12* (2006.01)
*G01F 23/04* (2006.01)

(52) U.S. Cl.
CPC ............. *F01M 11/12* (2013.01); *G01F 23/04* (2013.01)

(58) Field of Classification Search
CPC ........ F01M 11/12; G01F 23/04; G01F 23/045
See application file for complete search history.

(56) References Cited

U.S. PATENT DOCUMENTS 3,296,703 A * 1/1967 Stade .................... G01F 23/04
                                                      33/731
3,703,038 A * 11/1972 Smith .................. G01F 23/045
                                                      33/725
(Continued)

FOREIGN PATENT DOCUMENTS

CN       101776003 A       7/2010
DE       40 27 286 A1      3/1992
(Continued)

OTHER PUBLICATIONS

International Search Report (PCT/ISA/210) issued in PCT Application No. PCT/EP2019/067794 dated Sep. 26, 2019 with English translation (four (4) pages).
German-language Written Opinion (PCT/ISA/237) issued in PCT Application No. PCT/EP2019/067794 dated Sep. 26, 2019 (five (5) pages).
(Continued)

*Primary Examiner* — Kurt Philip Liethen
(74) *Attorney, Agent, or Firm* — Crowell & Moring LLP

(57) ABSTRACT

An oil measurement apparatus for an oil-lubricated internal combustion engine has an oil dipstick and a guide for guiding the oil dipstick in an oil pan of the internal combustion engine. A fill level of motor oil in the oil pan can be recorded by the oil measurement apparatus. The oil dipstick has an operating element in a first end region for inserting and removing the oil dipstick in the guide and, in a second end region, has a measurement region for recording the fill level. The fill level can be recorded by the oil dipstick in a first state of the oil measurement apparatus and, in a second state of the oil measurement apparatus, the measurement region is completely drawn into the guide. The oil dipstick has a dipstick stop element between the operating element and the measurement region, and has a dipstick cover, which is movable between the measurement region and the dipstick stop element and is designed to at least temporarily cover the measurement region. In the second state of the oil measure-
(Continued)

ment apparatus, the measurement region is covered by the dipstick cover at least in sections.

17 Claims, 3 Drawing Sheets

(56) References Cited

U.S. PATENT DOCUMENTS

| | | | | |
|---|---|---|---|---|
| 4,110,909 | A | * | 9/1978 | Mayr ................... G01F 23/04 33/725 |
| 4,176,457 | A | * | 12/1979 | Keffeler ................ G01F 23/04 33/727 |
| 4,330,940 | A | | 5/1982 | Leitgeb |
| 5,099,584 | A | * | 3/1992 | Williams ............. G01F 23/045 33/728 |
| 5,992,037 | A | * | 11/1999 | Klotz ................... G01F 23/04 33/723 |
| 6,289,601 | B1 | * | 9/2001 | Bricker ................ G01F 23/04 73/290 R |
| 7,322,232 | B1 | * | 1/2008 | Bolaski ................ G01F 23/04 33/723 |
| 2003/0121168 | A1 | * | 7/2003 | Matsumoto ......... G01F 23/04 33/726 |
| 2011/0011366 | A1 | | 1/2011 | Kauer et al. |
| 2016/0003661 | A1 | * | 1/2016 | Shigemoto ........... G01F 23/04 33/730 |
| 2016/0273422 | A1 | * | 9/2016 | Matsumoto ........... F01M 11/12 |

FOREIGN PATENT DOCUMENTS

| | | | |
|---|---|---|---|
| DE | 92 18 459 U1 | 5/1994 | |
| DE | 196 10 734 A1 | 10/1996 | |
| DE | 40 27 286 C2 | 8/1999 | |
| DE | 4027286 C2 * | 8/1999 | ........... G01F 23/045 |
| DE | 299 01 572 U1 | 10/1999 | |
| DE | 10 2005 028 807 A1 | 1/2007 | |
| EP | 0 022 448 A1 | 1/1981 | |
| EP | 0 547 384 A1 | 6/1993 | |
| EP | 1452839 A2 * | 9/2004 | ............. G01F 23/04 |

OTHER PUBLICATIONS

German-language Office Action issued in German Application No. 10 2018 212 021.8 dated May 13, 2019 (six (6) pages).
German-language Decision to Grant in German Application No. 10 2018 212 021.8 dated Sep. 17, 2019 (eight (8) pages).
Chinese-language Office Action issued in Chinese Application No. 201980039384.9 dated Nov. 30, 2021 with English translation (14 pages).

* cited by examiner

OIL MEASUREMENT APPARATUS

BACKGROUND AND SUMMARY OF THE INVENTION

The invention relates to an oil measurement apparatus for an oil-lubricated internal combustion engine and, more particularly, to a measurement apparatus having an oil dipstick and a guide for guiding the oil dipstick into an oil pan of the internal combustion engine, wherein a fill level of engine oil in the oil pan can be recorded by means of the oil measurement apparatus. An oil measurement apparatus of the type described above is known from DE 10 2005 028 807 A1.

The invention is discussed in more detail below on the basis of an internal combustion engine with high power density in a motor vehicle with a so-called oil dipstick as an oil measurement apparatus, but this is not to be understood as a limitation of the invention. In the case of an internal combustion engine with high power density, there is little available space therein for devices and functions which do not serve directly for the generation of drive power. Such a function which does not serve for the generation of drive power is, for example, the measurement of the fill level of the engine oil, which serves as a lubricant, in the so-called engine oil pan. To measure this fill level, the oil dipstick is led from above through the internal combustion engine into the oil pan. The engine oil is accommodated in the oil pan, and the fill level of the engine oil is reflected on the oil dipstick. To measure the fill level, the oil dipstick is pulled out of the internal combustion engine. During this pulling-out process, it can occur that the measurement result on the oil dipstick is falsified owing to the contorted path of the oil dipstick through the internal combustion engine.

It is an object of the invention to provide an oil measurement apparatus with improved functionality in relation to the prior art.

This object is achieved by means of an oil measurement apparatus according to the independent claims. Preferred refinements of the invention are the subject of the dependent patent claims.

In the context of the invention, an oil measurement apparatus is to be understood to mean an apparatus which is configured for measuring a fill level of engine oil which is accommodated in particular in an oil pan of an oil-lubricated internal combustion engine. For the measurement of the fill level or of the fill height of the engine oil in the oil pan, the oil measurement apparatus has an oil dipstick and a guide for guiding the oil dipstick in or on the internal combustion engine into the oil pan.

In the context of the invention, the oil pan or an engine oil pan is to be understood to mean a device for accommodating and storing engine oil or a lubricant for the lubrication of the oil-lubricated internal combustion engine. Conventionally, in the intended installation position of the internal combustion engine, such an engine oil pan is arranged thereon at the bottom, whereas the oil dipstick is inserted in particular from above on the internal combustion engine and is thus guided virtually all the way through the internal combustion engine or laterally past the latter.

An oil measurement apparatus per se is known from the prior art. Owing to a geometrically difficult path for the oil dipstick, that is to say a path with numerous bends, to reach the engine oil pan, falsification of the measurement result of the oil measurement apparatus can occur.

In the context of the invention, the oil dipstick is to be understood to mean a device which, in a first end region, has a handling element for the insertion and removal of the oil dipstick into and from the guide. Here, said handling element is to be understood as a grip or as a handle. Furthermore, the oil dipstick has a measurement region in a second end region which is situated opposite the first end region. Here, the measurement region is provided such that the fill level of the engine oil, in particular in the engine oil pan, is reflected thereon. Such a measurement region may in particular have markings for a minimum fill level and/or a maximum fill level of the engine oil in the engine oil pan. In the context of the invention, a measurement region of said type is thus to be understood to mean a portion of the oil dipstick which is configured for being dipped into the engine oil, which is situated in particular in the engine oil pan, during intended operation.

In the context of the invention, a guide is to be understood to mean a device which is configured for guiding the oil dipstick in a defined manner from outside the internal combustion engine into the oil pan of the internal combustion engine during the insertion of the oil dipstick, that is to say for predefining at least certain portions or the entirety of a particular path for the oil dipstick. There are many moving parts in an internal combustion engine, the guide is provided to prevent contact of the oil dipstick in particular with said moving parts, in particular contact of the dipstick with said moving parts can be prevented by the guide. The guide may preferably be understood to mean a guide rail, preferably a guide hose, or particularly preferably guide tube.

A distinction can be made between in particular two states of the oil measurement apparatus, in a first state of said oil measurement apparatus the fill level of the engine oil can be recorded. In said first state, the oil dipstick is preferably fully inserted into the guide, such that preferably the measurement region projects out of the guide, in particular projects into the engine oil pan, and the fill level of the engine oil can thus be recorded.

In a second state of the oil measurement apparatus, the measurement region of the oil dipstick is fully retracted into the guide and is thus preferably entirely or at least partially covered thereby.

Figuratively speaking, such a second state of the oil measurement apparatus arises if the oil dipstick is being pulled out through the guide by a user, that is to say when the oil dipstick has not yet been completely removed from said guide and the measurement region is no longer projecting out of the guide for the purposes of recording the fill level.

It is furthermore preferable for a dipstick cover element to be provided on said oil dipstick, said dipstick cover element is configured to at least partially or completely cover the measurement region of the oil dipstick in the second state of the oil measurement apparatus and furthermore preferably to expose, that is to say not cover, said measurement region in the first state. It is furthermore preferable for the dipstick cover element to be received so as to be displaceable along the oil dipstick, the dipstick cover element preferably surrounds the oil dipstick in a radial direction and is thus displaceable in an axial direction along the oil dipstick.

It is furthermore preferable for a dipstick stop element to be provided, this is configured to allow a displacement of the dipstick cover element relative to the oil dipstick as far as a predefinable position in an axial direction and to prevent a displacement beyond this.

The dipstick stop element is preferably to be regarded as an element fixed to the oil dipstick. Preferably, the dipstick stop element is fixedly clamped in non-positive locking fashion, or preferably connected cohesively or preferably in positively locking fashion, to the oil dipstick. It is furthermore preferable for the dipstick cover element to be movable between the dipstick stop element and the measurement region. In particular, the dipstick stop element is configured to, during the transfer of the oil measurement apparatus from the second state into the first state, drive the dipstick cover element along during a movement of the oil dipstick in an axial direction in the guide.

In particular by means of such a configuration of the oil measurement apparatus, the measurement region of the oil dipstick is covered by the dipstick cover element during a movement through the guide, and contact of the guide with the measurement region is prevented, and thus the measurement region is protected against falsification of the measurement result.

In a preferred embodiment of the invention, the dipstick cover element is in the form of a jacket tube which, in the first state of the oil measurement apparatus, is received preferably entirely and preferably at least partially in the guide. It is furthermore preferable that, in said first state, the measurement region of the oil dipstick is exposed by the dipstick cover element, in particular, in said state, said cover element does not cover the measurement region in an axial direction of the oil dipstick. In particular by means of such a design of the dipstick cover element as a tube, good protection of the measurement region in the guide can be attained.

In a preferred embodiment of the invention, the guide has a first end region, at which the oil dipstick can be introduced as planned. The first end region is, in the case of a planned installation of the oil measurement apparatus on or in an internal combustion engine, arranged preferably in the region of a so-called valve cover of the internal combustion engine or at a top side of the internal combustion engine. It is furthermore preferable for the oil measurement apparatus to have a second end region situated opposite the first end region.

Preferably, the guide extends as a tubular or hose-like body between said first and said second end region, and preferably has a multiplicity of bends and curves. A guide stop element is preferably arranged in the second end region, preferably directly at the end of the guide.

Preferably, the guide stop element is formed as a radial constriction at least in relation to the immediately adjacent region of the guide. Preferably, the guide stop element is formed integrally with the guide or is preferably, as a separate component, inserted into or connected to said guide, preferably connected in cohesive or preferably positively locking fashion to said guide. In particular, by means of the guide stop element, it can be achieved that the dipstick cover element is stopped at the end, that is to say when the second end region of the guide is reached, during a movement of the oil dipstick from the first end region of the guide toward the second end region. In particular, by means of a guide stop element, the dipstick cover element has a defined end position during a movement of the oil dipstick from the first end region to the second end region of the guide, and thus high operational reliability of the oil measurement apparatus can be achieved.

In a preferred embodiment of the invention, the guide stop element is in the form of a radially encircling constriction in or on the guide. Preferably, the guide stop element is in the form of an elevation which runs in ring-shaped encircling fashion in the guide. In particular, by means of an encircling elevation, reliable definition of the end position of the dipstick cover element is made possible.

In a preferred embodiment of the invention, the measurement region of the oil dipstick has a first support region, a measurement point and a second support region. Preferably, the measurement point is configured for recording the fill level, in particular of the engine oil in the engine oil pan, and the first and the second support region are configured to be supported on the dipstick cover element during a movement of the oil dipstick through the guide (second state of the oil measurement apparatus).

The fill level can preferably be read off from the measurement point along an axial extent of said measurement point, in particular when the oil dipstick has been fully removed from the guide. Preferably, said support regions have, at least in certain portions, a radial extent, orthogonal with respect to the axial extent, which is greater than a radial extent of the measurement point. In particular by means of such a gradation of diameters, in the case that both the support regions and the measurement point have a circular cross section, it is made possible to ensure that the dipstick cover element does not make contact with the measurement point, in particular in the second state of the oil measurement apparatus, and thus high operational reliability can be achieved.

It is furthermore preferable if, in the second state of the oil measurement apparatus, that is to say when the measurement point has been retracted into the dipstick cover element, at least the first support region does not bear against the dipstick cover element.

In a preferred embodiment of the invention, the measurement point is arranged geometrically between the first and the second support region. In particular by means of such an embodiment of the invention, it is made possible for the measurement point to be spaced apart from the dipstick cover element in a particularly effective manner, and for high functional reliability for the oil measurement apparatus to be achieved.

In a preferred embodiment, in the first state of the oil measurement apparatus, that is to say in particular in the state in which the fill level of the engine oil is recorded at the measurement point, the dipstick cover element bears against the guide stop element and against the dipstick stop element. By means of such a design, the dipstick cover element is positively fixed in its position in the guide.

In a preferred embodiment of the invention, a seal is arranged in the second end region of the guide, that is to say at the end region which faces toward the measurement region in the first state of the oil measurement apparatus, or on the dipstick cover element. In particular by means of such a seal, the guide can be closed off in fluid-tight fashion with respect to the dipstick cover element, and it is thus possible to prevent in particular engine oil from passing between the guide and the dipstick cover element, and convenient handling of the oil measurement apparatus is thus made possible.

An oil-lubricated internal combustion engine having an oil measurement apparatus of the type described above is also provided.

Individual features and embodiments of the invention will be discussed in more detail below on the basis of the figures.

DETAILED DESCRIPTION OF THE DRAWINGS

Figure 1:
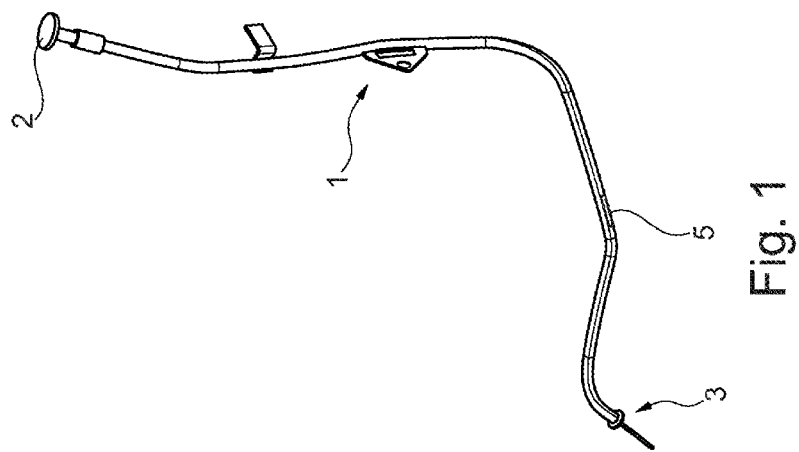
FIG. 1 is a perspective view of an oil measurement apparatus.

FIG. 1 illustrates an oil measurement apparatus 1 in its 3D form. At the upper end, the oil measurement apparatus 1 has a grip in the form of a handling element 2, by means of which the oil dipstick can be pulled out of the guide tube 5, this forms the guide element, and pushed into said guide tube again. The fill level of the engine oil in an oil pan can be recorded by means of the measurement region 3 at the lower end of the oil measurement apparatus 1. Falsification of the measurement result on the measurement region 3 can occur owing to the tight bends of the guide tube 5.

Figure 2:
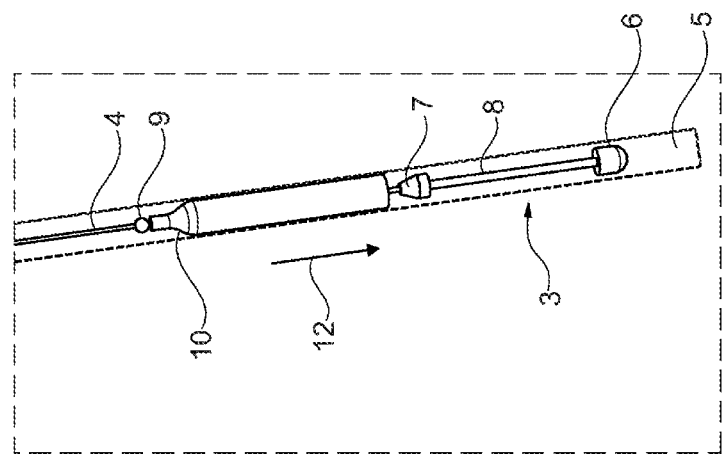
FIG. 2 is a perspective detail view of the oil dipstick during insertion into the guide element.

FIG. 2 illustrates the guide tube 5 in partially transparent form, in this way the measurement region 3 with the measurement point 8 with the first and second support regions 6, 7 can be seen. On the oil dipstick 4, it is possible to see the dipstick stop element 9. During the insertion of the oil dipstick 4 into the guide tube 5 the dipstick cover element 10 bears against the dipstick stop element 9. The movement direction 12 of the oil dipstick 4 into the guide tube 5 is downward in the view illustrated. The first and second support regions 6, 7 do not bear against the dipstick cover element 10 in this movement direction 12. In the opposite direction, that is to say from the bottom upward, the measurement region 3 is received in the dipstick cover element 10. For this situation, the first and second support regions 6, 7 bear against the dipstick cover element 10 and the dipstick cover element 10 protects the measurement point 8, which is arranged between the first and the second support region 6, 7, against contact with the guide tube 5, and thus the measurement result is not falsified as the oil dipstick 4 is pulled out of the guide tube 5, and the functionality of the oil measurement apparatus is improved.

Figure 3:
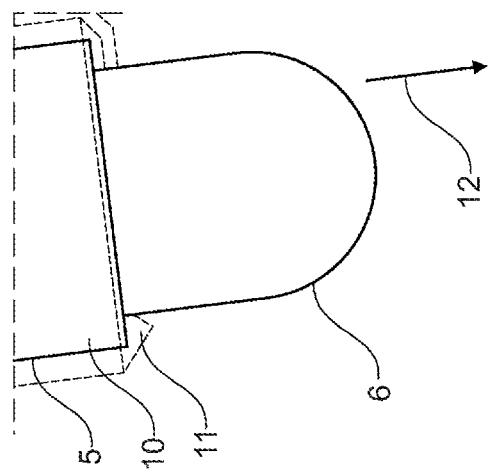
FIG. 3 is a detailed view of the first support region, of the cover element and of the guide element.

FIG. 3 illustrates the lower region of the guide tube 5 with the guide stop element 11. The guide stop element 11 prevents the dipstick cover element 10 from being pushed out of the guide tube 5 downward, that is to say in the movement direction 12, and is in the form of a radially encircling elevation in the guide tube 5. When the dipstick cover element 10 bears against said guide stop element 11 during the insertion of the oil dipstick 4 into the guide tube 5, the measurement region 3 with the first and second support regions 6, 7 and the measurement point 8 arranged in between is pushed downward out of the guide tube 5 and transferred into the first state, illustrated in FIG. 4, of the oil measurement apparatus, in which the fill level of engine oil in the engine oil pan can be recorded.

Figure 4:
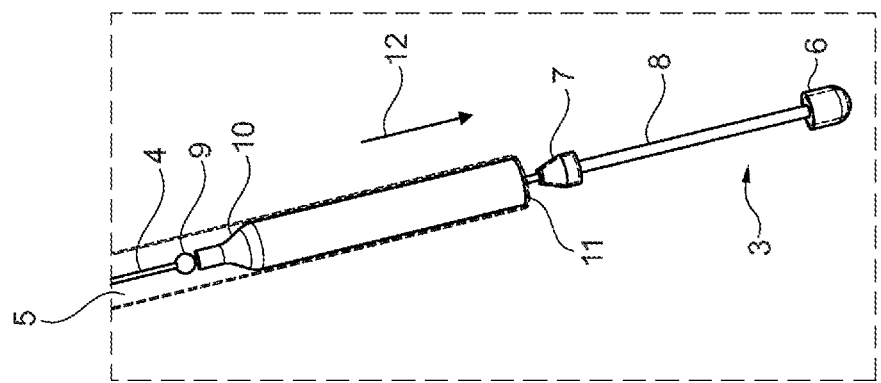
FIG. 4 is a perspective view of the oil measurement apparatus in the first state, in which the fill level can be recorded by means of the measurement region.

In FIG. 4, the measurement region 3 has been pushed out of the guide tube 5 in the movement direction 12. The dipstick cover element 10 is seated on the guide stop element 11 and is pushed downward by the dipstick stop element 9. If the oil dipstick 4 is pulled upward out of the guide tube 5 (counter to the movement direction 12), firstly the measurement region 3 with the first and second support regions 6, 7 slides into the dipstick cover element 10 and said dipstick cover element 11 reliably covers the measurement point 8 during the further movement of the oil dipstick 4 through the guide tube 5, and thus prevents contact of the measurement point 8 with the guide tube 5.

Figure 5:
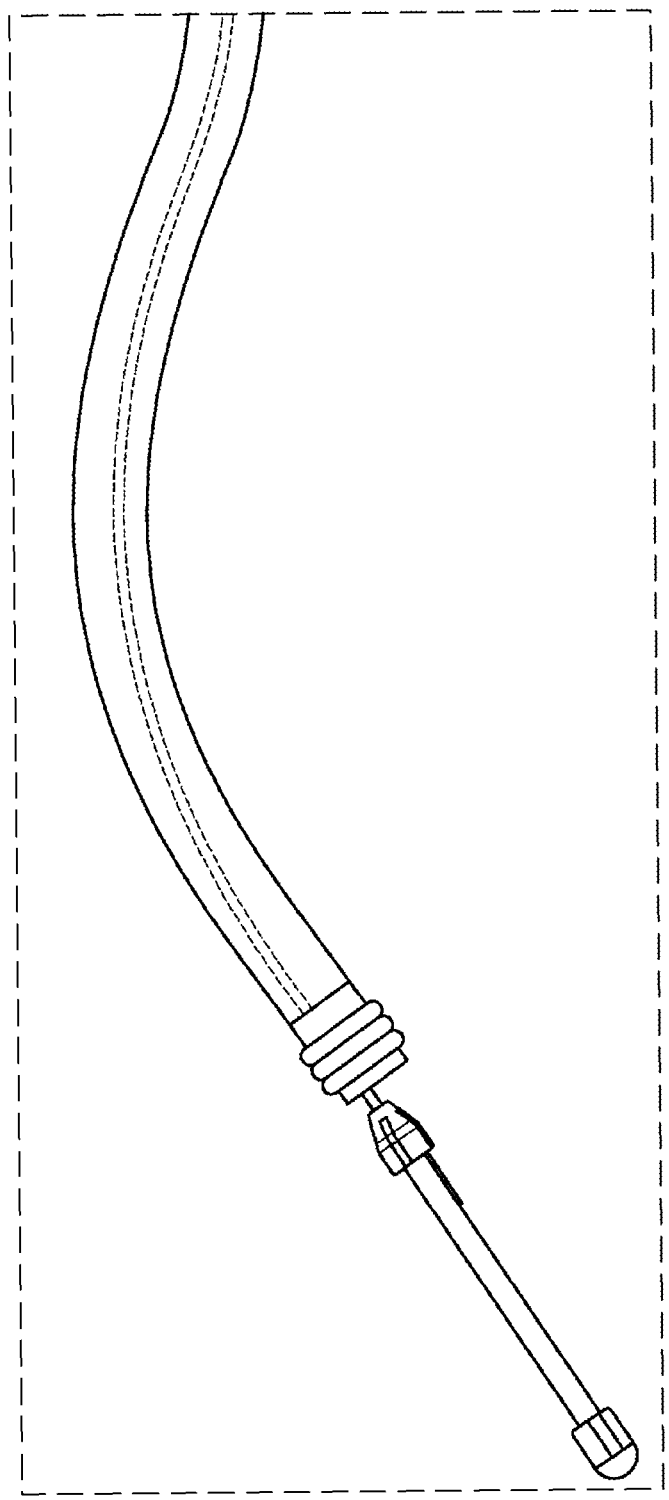
FIG. 5 illustrates an oil measurement apparatus known from the prior art.

FIG. 5 illustrates an oil measurement apparatus known from the prior art. The oil measurement apparatus does not have the dipstick cover device.

In other words, the so-called oil dipstick is provided for the monitoring of the oil level or of the fill level of the engine oil in an internal combustion engine. In the prior art, there are some characteristic components and characteristics which are usually identical irrespective of type series, engine generation, number of cylinders.

These are inter alia:

The guide tube with a particular diameter, this receives the oil dipstick, composed of grip, strand (connecting element between grip and measurement region) and measurement region. Furthermore, the guide tube constitutes a connection between the engine top side, the grip of the oil dipstick is arranged here when the oil dipstick has been pushed fully into the guide tube (first state of the oil measurement apparatus), and location of the engine oil (lowermost point of engine oil pan).

The grip of the oil dipstick seals off the guide tube, in particular when it has been fully inserted into the guide tube. To achieve the sealing action, an O-ring seal is commonly provided. Furthermore, the grip constitutes a means for handling of the oil dipstick for a user.

At the lower end of the oil dipstick in relation to the planned installation position thereof in an internal combustion engine, there is situated the measurement region, which can also be referred to as measurement tongue. In the measurement region, there are arranged markings for a minimum admissible fill level (MIN) and a maximum admissible fill level (MAX).

The strand may be produced from a wire, wire cable or metal strip or the like.

Owing to design specifications in the design of the internal combustion engine, it is normally necessary in the case of the oil measurement apparatus for a path with tight bends to be described by the guide tube from the top side of the internal combustion engine to the engine oil pan, in order in particular to allow the packaging of the internal combustion engine.

Said boundary conditions generally adversely affect the functionality of the oil measurement apparatus, in particular the read-off quality/accuracy can be adversely affected during the pulling of the oil dipstick.

The read-off quality/accuracy may be adversely affected for example by unfavorable tube cross sections of the guide tube and of the radii thereof, whereby contact of the measurement point with the inner side of the guide tube can occur as the oil dipstick is pulled out of the guide tube. The consequence is that engine oil that has passed into the guide tube as a result of the operation of the internal combustion engine and the resulting chaotic oil turbulence can be deposited on the measurement point and thus falsify the measurement result.

A basic concept of the invention is that of preventing contact between measurement point and inner side of the guide tube. This can be achieved by means of a sleeve, that is to say the dipstick cover element, of the described type.

The sleeve (dipstick cover element) is attached between measurement region and guide tube and, during the pulling of the oil dipstick out of the guide tube (second state of the oil measurement apparatus), receives the measurement region, said sleeve thus shields the measurement region from the inner wall of the guide tube. By means of the invention, no scraping or contact between measurement region and tube inner wall of the guide tube occurs, and thus a more accurate measurement result can be achieved.

LIST OF REFERENCE DESIGNATIONS

1 Oil measurement apparatus
2 Handling element
3 Measurement region
4 Oil dipstick
5 Guide tube
6 First support region
7 Second support region
8 Measurement point
9 Dipstick stop element
10 Dipstick cover element
11 Guide stop element
12 Movement direction of the oil dipstick during insertion into the guide tube

What is claimed is:

1. An oil measurement apparatus for an oil-lubricated internal combustion engine, comprising:
   an oil dipstick; and
   a guide for guiding the oil dipstick into an oil pan of the internal combustion engine, wherein a measurement point of a measurement region of the oil dipstick is configured to record a fill level of engine oil in the oil pan,
   wherein the oil dipstick, in a first end region, has a handling element for inserting and removing the oil dipstick into and from the guide, and in a second end region the oil dipstick has the measurement region configured to record the fill level,
   wherein, in a first state of the oil measurement apparatus, the measurement region extends out of the guide and into the oil pan such that the measurement point of the measurement region can record said fill level and, in a second state of the oil measurement apparatus, the measurement region is fully retracted into the guide,
   wherein the oil dipstick has a dipstick stop element between the handling element and the measurement region,
   wherein the oil dipstick has a dipstick cover which is displaceable between the measurement region and the dipstick stop element,
   wherein the dipstick cover is configured for at least temporarily covering the measurement point without contacting the measurement point,
   wherein, in the second state of the oil measurement apparatus, the measurement point is covered at least in certain portions by the dipstick cover without being contacted by the dipstick cover,
   wherein the dipstick cover is in a form of a jacket tube which, in the first state, is received in certain portions or entirely in the guide, and
   wherein, in the first state, the measurement region extends from the dipstick cover and is not covered by the dipstick cover.

2. The oil measurement apparatus according to claim 1, wherein
   the guide has a first end region, in which the oil dipstick is introduced as intended, and a second end region, which is situated opposite the first end region,
   a guide stop element is arranged in the second end region of the guide, and
   the guide stop element forms a radial constriction at least with respect to an immediately adjacent region of the guide.

3. The oil measurement apparatus according to claim 2, wherein
   the guide stop element is in a form of a radially encircling constriction in the guide.

4. The oil measurement apparatus according to claim 1, wherein
   the measurement region of the oil dipstick has a first support region, the measurement point and a second support region,
   the fill level is readable off along an axial extent of the measurement point, and
   the first and second support regions have, at least in certain portions, a radial extent, orthogonal with respect to the axial extent, which is greater than a radial extent of the measurement point.

5. The oil measurement apparatus according to claim 4, wherein
   in the second state, the first support region bears against the dipstick cover element.

6. The oil measurement apparatus according to claim 4, wherein
   the measurement point is arranged geometrically between the first and the second support region.

7. The oil measurement apparatus according to claim 2, wherein
   in the first state, the dipstick cover bears both against the guide stop element and against the dipstick stop element.

8. The oil measurement apparatus according to claim 1, further comprising:
   a seal arranged in a second end region of the guide or on the dipstick cover.

9. An oil-lubricated internal combustion engine comprising an oil measurement apparatus according to claim 1.

10. An oil measurement apparatus for an oil-lubricated internal combustion engine, comprising:
    an oil dipstick; and
    a guide for guiding the oil dipstick into an oil pan of the internal combustion engine, wherein a measurement point of a measurement region of the oil dipstick is configured to record a fill level of engine oil in the oil pan,
    wherein the oil dipstick, in a first end region, has a handling element for inserting and removing the oil dipstick into and from the guide, and in a second end region the oil dipstick has the measurement region configured to record the fill level,
    wherein, in a first state of the oil measurement apparatus, the measurement region extends out of the guide and into the oil pan such that the measurement point of the measurement region can record said fill level and, in a second state of the oil measurement apparatus, the measurement region is fully retracted into the guide,
    wherein the oil dipstick has a dipstick stop element between the handling element and the measurement region,
    wherein the oil dipstick has a dipstick cover which is displaceable between the measurement region and the dipstick stop element,
    wherein the dipstick cover is configured for at least temporarily covering the measurement point without contacting the measurement point,
    wherein, in the second state of the oil measurement apparatus, the measurement point is covered at least in certain portions by the dipstick cover without being contacted by the dipstick cover,
    wherein the guide has a first end region, in which the oil dipstick is introduced as intended, and a second end region, which is situated opposite the first end region, wherein a guide stop element is arranged in the second end region of the guide, and wherein the guide stop element forms a radial constriction at least with respect to an immediately adjacent region of the guide.

11. The oil measurement apparatus according to claim 10, wherein the guide stop element is in a form of a radially encircling constriction in the guide.

12. The oil measurement apparatus according to claim 10, wherein the measurement region of the oil dipstick has a first support region, the measurement point and a second support region, the fill level is readable off along an axial extent of the measurement point, and the first and second support regions have, at least in certain portions, a radial extent, orthogonal with respect to the axial extent, which is greater than a radial extent of the measurement point.

13. The oil measurement apparatus according to claim 12, wherein in the second state, the first support region bears against the dipstick cover element.

14. The oil measurement apparatus according to claim 12, wherein the measurement point is arranged geometrically between the first and the second support region.

15. The oil measurement apparatus according to claim 10, wherein in the first state, the dipstick cover bears both against the guide stop element and against the dipstick stop element.

16. The oil measurement apparatus according to claim 10, further comprising:

a seal arranged in the second end region of the guide or on the dipstick cover.

17. An oil-lubricated internal combustion engine comprising an oil measurement apparatus according to claim 10.

* * * * *